United States Patent [19]
Lovie

[11] Patent Number: 5,809,194
[45] Date of Patent: *Sep. 15, 1998

[54] METHOD AND APPARATUS FOR MARKING THE PROTECTIVE JACKETS OF OPTICAL FIBER CABLES TO IDENTIFY SWITCHBACK LOCATIONS

[75] Inventor: Raymond Gordon Lovie, Hickory, N.C.

[73] Assignee: Alcatel NA Cable Systems, Inc., Claremont, N.C.

[*] Notice: This patent issued on a continued prosecution application filed under 37 CFR 1.53(d), and is subject to the twenty year patent term provisions of 35 U.S.C. 154(a)(2).

[21] Appl. No.: 483,543

[22] Filed: Jun. 7, 1995

Related U.S. Application Data

[63] Continuation of Ser. No. 483,543, Jun. 7, 1995.

[51] Int. Cl.$^6$ .................................................. G02B 6/44
[52] U.S. Cl. ........................... 385/104; 385/111; 57/6; 57/293
[58] Field of Search ........................ 385/104, 111, 385/109; 57/293, 294, 6

[56] References Cited

U.S. PATENT DOCUMENTS

| | | |
|---|---|---|
| 3,197,554 | 7/1965 | Baker . |
| 4,497,164 | 2/1985 | Dotti et al. ........................... 57/6 |
| 4,543,448 | 9/1985 | Deurloo . |
| 4,565,591 | 1/1986 | Shannon . |
| 4,659,424 | 4/1987 | Baxter et al. . |
| 4,746,190 | 5/1988 | Oestreich et al. ............... 350/96.23 |
| 4,773,207 | 9/1988 | Cramer ................................ 57/294 |
| 4,822,134 | 4/1989 | Campbell ............................ 385/109 |
| 4,828,352 | 5/1989 | Kraft .................................. 350/96.23 |
| 4,837,405 | 6/1989 | Bonjour et al. . |
| 4,865,415 | 9/1989 | Kitayama ............................ 385/104 |
| 4,880,484 | 11/1989 | Obermeier et al. ................. 156/51 |

FOREIGN PATENT DOCUMENTS

| | | |
|---|---|---|
| 0484536 | 2/1991 | European Pat. Off. . |
| 1465975 | 5/1969 | Germany . |
| 3637206 | 5/1988 | Germany . |
| 4638748 | 11/1971 | Japan . |

*Primary Examiner*—Rodney B. Bovernick
*Assistant Examiner*—Yisun Song
*Attorney, Agent, or Firm*—Ware, Fressola, Van Der Sluys & Adolphson LLP

[57] ABSTRACT

A process for marking an outer jacket of an oscillating lay cable to indicate the locations of switchbacks thereunder. The process includes the step of providing detectable markings on an unjacketed cable core in predetermined position relative to the switchback. The process further includes the steps of sensing the detectable markings with a sensor prior to extruding an outer jacket over the cable core, predicting the location of the sensed markings on the cable core after a cable jacket has been extruded, and providing a marking on the cable jacket at a predetermined position relative to the predicted location of the sensed marking.

14 Claims, 3 Drawing Sheets

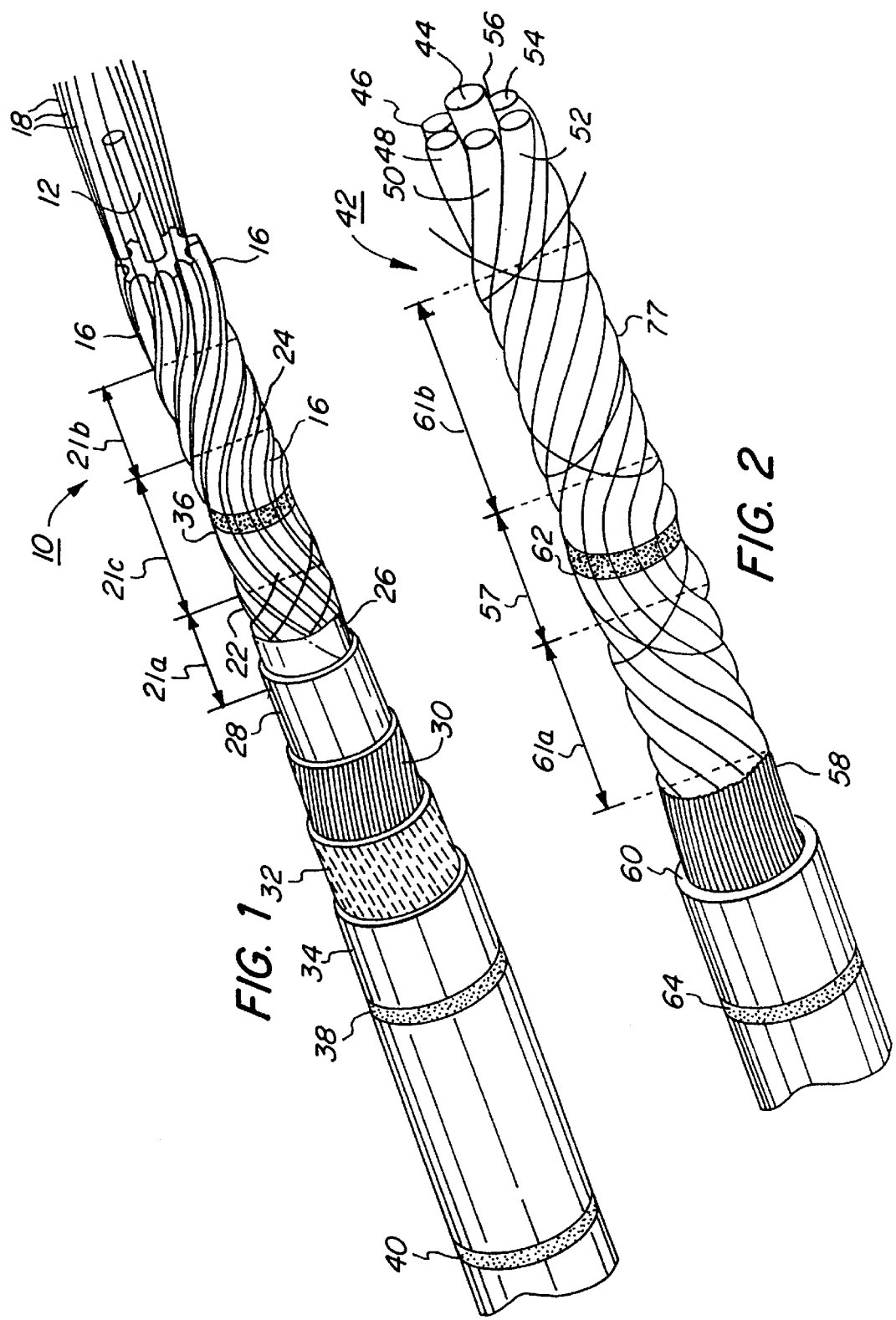

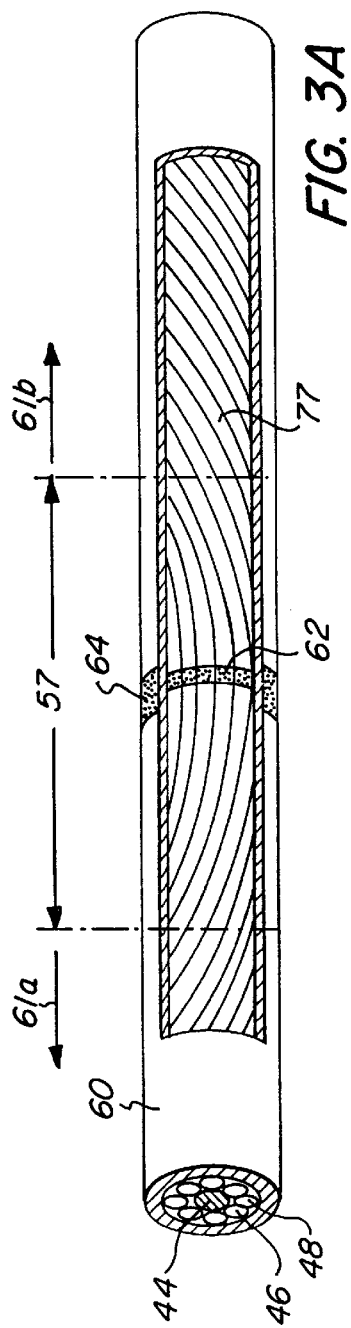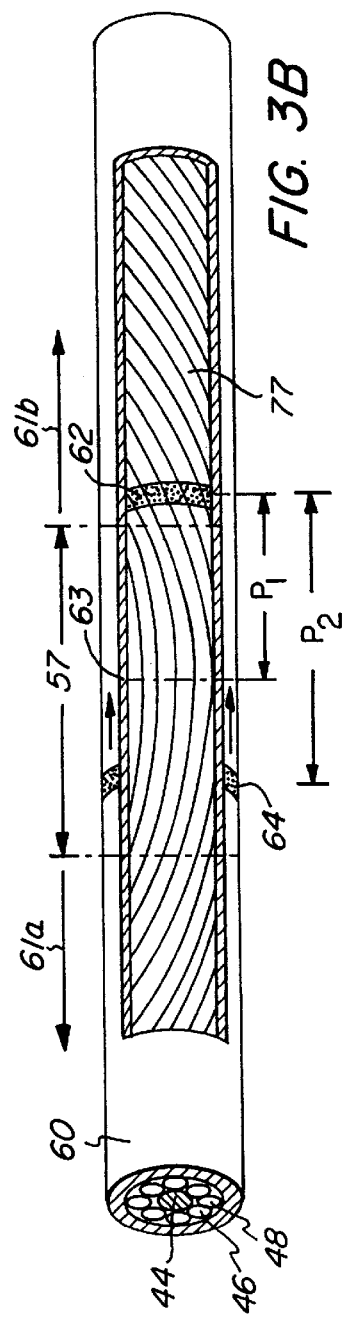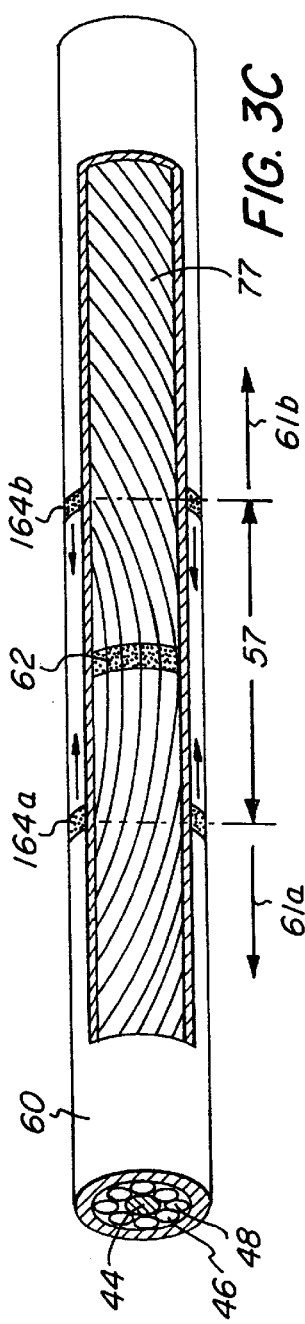

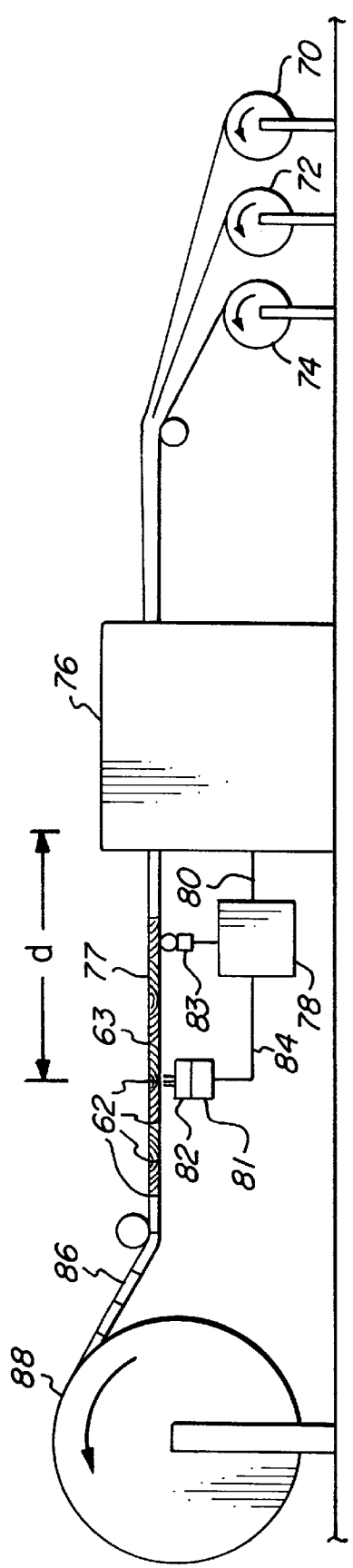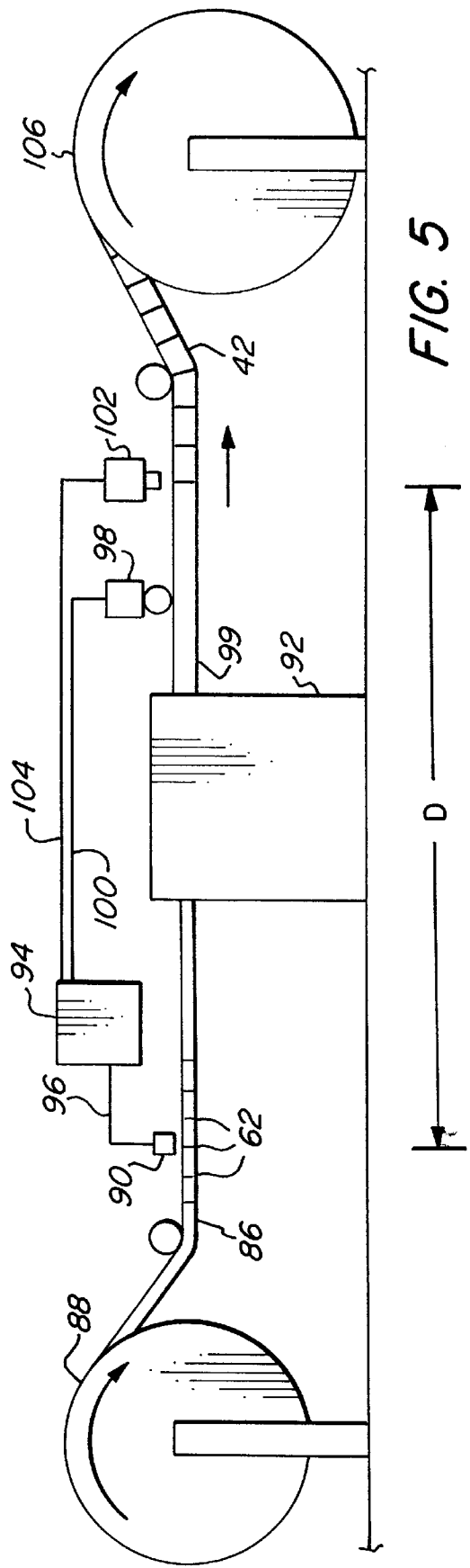

METHOD AND APPARATUS FOR MARKING THE PROTECTIVE JACKETS OF OPTICAL FIBER CABLES TO IDENTIFY SWITCHBACK LOCATIONS

CROSS-REFERENCE TO RELATED APPLICATIONS

This is a continuation of co-pending application Ser. No. 68/483,543 filed on Jun. 7, 1995. The entire subject matter of the prior co-pending application is incorporated herein by reference.

BACKGROUND OF THE INVENTION

1. Field of the Invention

The present invention generally relates to the field of optical fiber communication cables, and more particularly to a method and apparatus for marking the protective jackets of optical fiber cables to identify the location of reverse oscillating lay switchbacks.

2. Description of the Prior Art

Reverse oscillating lay (ROL) optical fiber cables, sometimes referred to as S-Z stranded cables, comprise a plurality of buffer tubes or core tubes stranded helically about a central strength member. Periodically, the direction of the lay of the helical stranding is reversed. The locations where the helix lay reverses are known as switchbacks, and they provide points along the cable where the buffered optical fibers are not constrained by the helical configuration of the cable. Because the optical fibers are not constrained at the switchback, switchback locations are typically the points where mid-span splices are made into the cable. Unfortunately, switchback locations are not readily observable because the strands of the cable are covered by a relatively thick, opaque polyethylene outer jacket.

Generally, ROL stranded cables are manufactured using a two step process. The first step of the two step process comprises forming a length of an unjacketed, ROL stranded buffer tube core with a reverse oscillating strander. Once the stranding process is completed, the ROL stranded cable core is usually taken up on a spool. Generally, in the second step, the spooled ROL stranded cable core is despooled and fed through an extruder where a protective polyethylene jacket is extruded over the stranded cable core. Those skilled in the art will appreciate that while the location of the switchbacks is known and readily observable prior to the extrusion process, the location becomes obscured once the relatively thick, opaque polyethylene jacket is placed over the stranded cable.

Section 5.2.3 of the Generic Requirements for Fiber and Cable, No. TR-NWT-000020, Issue 5, December, 1992, sets forth an objective stating that "cables, containing multiple core or buffer tubes stranded using the reverse oscillating lay method, should indicate on the cable jacket the locations of the reversal midpoints." This general objective has been reiterated more specifically in Section 6.2.3 of the Generic Requirements for Optical Fiber and Fiber Optic Cable, No. GR-20-CORE, Issue 1, September, 1994 wherein it states "cables containing stranded multiple core or buffer tubes using the reverse oscillation lay method should indicate the midpoints of the reversal length within ±150 mm (6 inches) on the outer cable jacket."

Prior art U.S. Pat. No. 4,828,352 discloses an ROL or S-Z stranded cable that appears to meet the objectives stated in Sections 5.2.3 and 6.2.3 described above. The outer jacket of the cable described therein has markings on the outer jacket identifying switchback locations. As shown by the several figures of the patent, the marking is desirable because it provides precise information about the location of switchbacks under the jacket to a crafts person who may intend to make a splice into the cable in the field. Unfortunately for those skilled in the art of making such a cable, this patent does not provide any information as to how to provide such markings on the outer jacket during the cable manufacturing process so that the markings will be aligned with or "transversely co-extensive" with the switchbacks as called for in the patent claims.

A process for periodically marking the outer jacket of a cable is described in U.S. Pat. No. 4,880,484. The marking process of that patent generally comprises several steps. The first step calls for drawing a plurality of conductors in a longitudinal direction through an apparatus that affixes a plurality of magnetizable clamps along the length of the conductors. After the magnetizable clamps are affixed, a protective jacket of insulating material is applied about the conductors and magnetizable clamps affixed thereto. After jacketing, the outside of the protective jacket is marked in accordance with control signals generated by a sensing device that detects the presence of each of the magnetizable inserts through the jacket as the cable is drawn through the sensing device. While this patent is directed to periodically marking the jacket of a cable, the method of this patent, unlike the present invention, is unrelated to identifying and marking switchback locations of ROL stranded cables during the ROL cable manufacturing process. Furthermore, the process described in this patent could not be successfully employed with ROL optical fiber cables because the optical fibers cannot be subjected to the stresses induced by the magnetizable clamp.

SUMMARY OF THE INVENTION

It is therefore an object of the present invention to provide an optical fiber cable with markings or indicia on its outer protective jacket to indicate the position of at least one cable element laying underneath the outer jacket.

It is another object of the present invention to provide a method for marking switchback locations on the outer protective jacket of reverse oscillating lay optical fiber cables during the cable manufacturing process.

It is another object of the present invention to provide an apparatus for marking the switchback locations.

It is an additional object of the present invention to provide a method and apparatus to mark the outer jackets of reverse oscillating cables so that they will meet the objectives set forth in Section 6.2.3 of the Generic Requirements for Optical Fiber and Fiber Optic Cable, No. GR-20-CORE, Issue 1, September, 1994.

In accordance with the present invention, an optical fiber cable core is provided which includes a central strength member, and a plurality of buffer tubes containing at least one optical fiber. The buffer tubes are arranged about the central strength member to form a first lay orientation region, a second lay orientation region, and a transition region between the first lay orientation region and the second lay orientation region where a reverse oscillating lay switchback is located. The cable core further includes a detectable marking on the plurality of buffer tubes in a predetermined position relative to the transition region to indicate the presence and approximate position of the switchback. The cable core with the detectable marking facilitates the manufacture of an optical fiber cable having an outer jacket with switchback indicative markings complying with Section 6.2.3 of the Generic Requirements for Optical Fiber and Fiber Optic Cable, No. GR-20-CORE.

Further, the present invention provides a method for making an optical fiber cable core having markings to indicate the position switchbacks. The method comprises several steps, including: providing a central strength member and a plurality of buffer tubes containing at least one optical fiber, arranging the plurality of buffer tubes about the central strength member in a first lay orientation to form a first lay orientation region, and arranging the plurality of buffer tubes in a second lay orientation to form a second lay orientation region and a transition region containing a switchback between the first and second lay orientation regions. The method also includes the step of providing a detectable mark on the cable core at a predetermined position relative to the transition region. Once the detectable mark has been placed on the cable core, the marked cable core may be taken up on a spool for temporary storage.

As mentioned above, the detectable mark facilitates the manufacture of an optical fiber cable having an outer jacket with markings, complying with Section 6.2.3 of the Generic Requirements, indicating the location of switchbacks. Such an optical fiber cable can be made by despooling the marked cable core, sensing the marking with a sensor, continuously tracking the position of the marking on the core relative to the sensor, surrounding the core with an outer jacket, and providing a marking on the outer jacket at a predetermined position based upon the predicted position of the marking on the core relative to the sensor.

Other objects and advantages of the present invention will become apparent and the invention will be more fully understood when reference is made to the following detailed description taken in conjunction with the accompanying drawings.

BRIEF DESCRIPTION OF THE DRAWINGS

The drawings, not drawn to scale, include:

FIG. 1, which is a broken perspective view, showing an optical fiber cable containing a slotted core having a plurality of helical slots arranged in a first lay directions a second lay direction and a transition region therebetween and a marking applied to the slotted core and outer jacket;

FIG. 2, which is a broken perspective view, showing an optical fiber cable containing a plurality of buffer tubes for optical fibers wound around a central structural member in a reverse oscillating helical lay and a protective outer jacket having a marking at a predetermined location relative to the transition region of the cable where the helical lay reverses direction from a first orientation to a second orientation;

FIGS. 3A through 3C which are partial cutaway isometric views of several different cable embodiments, illustrating several examples of different marking schemes that can be made according to the present invention;

FIG. 4, which is a schematic illustration of the apparatus for manufacturing reverse oscillating lay stranded cable with marked switchback locations; and FIG. 5, which is a schematic illustration of the apparatus for marking the protective outer jacket to identify the location of a switchback.

DETAILED DESCRIPTION OF THE PRESENT INVENTION

The present invention is a method and apparatus for marking switchback locations on the outer jacket of oscillating lay stranded cables, such as ROL or S-Z cables containing optical fibers which are stranded in reverse oscillating lays. By using the method and apparatus of the present invention, the markings on the outer jacket of such cables should comply with the Section 6.2.3 of the Generic Requirements set forth above.

FIGS. 1 and 2 illustrate two embodiments of ROL type optical fiber cables having markings meeting the Section 6.2.3 requirements. Such cables can be made according to the method and apparatus of the present invention as will be described fully below. Referring to FIG. 1, there is shown a stranded core type ROL optical fiber cable 10. The cable 10 includes a central strength member 12 that is surrounded by a core member 14. The core member 14 contains a plurality of helical grooves 16. The grooves 16 provide protective guides for optical fibers 18 which lay in the guides 16 in a stress-free state. The direction or lay of the helical grooves reverses periodically so as to provide a first lay orientation region 21a, a second lay orientation region 21b and a transition region 21c between the first and second lay orientation regions 21a and 21b. The transition region 21c provides an area where the fibers 18 are unconfined by the helical arrangement and, as those skilled in the art should appreciate, the transition region 21c is an ideal location for mailing splices into the cable 10. The location where the direction of the helix reverses in the transition region 21c, from what is typically known as the S configuration to a Z configuration, or vice-versa, is sometimes known as a switchback location. Ordinarily, although not necessarily, switchbacks occur periodically along the length of a cable.

FIG. 1 also illustrates that the cable 10 further comprises a helically wrapped core binder 22, gel 24 in the grooves 16, a mylar tape 26, a thermoplastic inner jacket 28, contrahelically applied radial strength components 30 and 32, and protective outer jacket 34. In addition to the structure set forth above, the cable 10 further includes one or more markings, such as 36, on the core 14. These markings are placed on the core 14 at predetermined positions relative to the transition region 21c of the core 14. In FIG. 1, the predetermined position of the marking 36 is directly in the middle of the transition region 21c which places the marking 36 directly over the switchback location. It will become apparent to those skilled in the art that the method and apparatus of the present invention make it possible to precisely provide a marking 36 on the core at any predetermined position relative to the transition region 21c.

In accordance with the present invention markings are also provided on the outer jacket 34 of the cable 10 at predetermined positions relative to the markings, similar to 36, on the cable core 14. Each of these outer jacket markings, for example 38 and 40, are useful to indicate the location of switchbacks lying under the jacket 34. Depending on the scheme used for switchback identification, a technician can easily identify where to make cuts in the outer jacket for splicing purposes. In the embodiment shown in FIG. 1, for example, markings 38 and 40 are directly over detectable markings on the core 14 which are, in turn, directly coincident with the location of switchbacks. While the markings 38 and 40 have been shown as bands, such markings provided on the outer jacket 34 may be in other forms such as words, notches or any other indicia capable of providing information regarding switchback locations to those skilled in the art of making cable splices.

FIG. 2, illustrates a reversing helically wound loose tube optical fiber cable 42. The cable 42 shown in FIG. 2 generally comprises a central strength member 44 surrounded by a plurality buffer tubes 46 through 56 to form a stranded cable core 77. Each of the buffer tubes may house loose optical fibers or optical fiber ribbons. Similar to the slotted core cable 10 of FIG. 1, the direction or lay of the helically wound buffer tubes reverses periodically so as to form a first lay orientation region 61a, a second lay orientation region 61b, and a transition region 57 between the first and second lay orientation regions 61a and 61b. The transition region 57 provides an area for easier splice access to the buffer tubes and optical fibers residing therein because the tubes and fibers are not constrained by the helical arrangement. Cable 46 further comprises a radial strength component 58, and a protective outer jacket 60. Also, similar to cable 10 of FIG. 1, the cable core 77 further includes at least one marking, such as 62, at a predetermined position relative to the transition region 57. In accordance with the present invention, at least one marking 64 is provided on outer jacket 60 at a predetermined position relative to marking 62 on the cable core 77. Outer jacket marking 64 may be utilized by those skilled in the art to identify the location of a switchback and, although such marking has been illustrated as a band, words or other indicia may be used for marking 64.

Referring to FIGS. 3A through 3C, those skilled in the art should appreciate that outer jacket markings, such as 64, and the cable core markings, such as 62, need not be placed directly over switchback locations 63, such as shown in FIG. 3A. The method and apparatus of the present invention facilitates the placement of core markings 62 and outer jacket markings 64 in any predetermined position relative to switchbacks 63. Referring to FIG. 3B for example, marking 62 may be positioned on cable core 77 in the second lay orientation region 61b, while outer jacket marking 64, which is applied to the outer jacket 64 at a predetermined position relative to marking 62 may actually be over the transition region 57 or even in the first lay orientation region 61a. Also, in the embodiment illustrated in FIG. 3B, marking 64 includes arrows which indicate the direction in which the nearest switchback 63 of the cable core 77 lies relative to marking 64. The marking 64 may also include words (not shown) indicating how far from the marking 64 the nearest switchback of the cable core 77 may be found. As will be explained below, marking 62 is applied to the core 77 at a predetermined position P1 relative to the nearest switchback 63 and marking 64 is typically applied to the outer jacket 60 at a predetermined position P2 relative to predicted position of marking 62 after the outer jacket 60 has been applied.

FIG. 3C illustrates another embodiment of the present invention wherein two outer jacket band markings 164a and 164b with arrows are provided on the outer jacket 60 to indicate a splice region which is approximately coincident with the boundaries of the transition region 57. Markings 164a and 164b are positioned on the outer jacket relative to marking 62 on the cable core 77.

Each of the marking schemes illustrated in the cable embodiments of FIGS. 3A through 3C, as well as virtually any other marking scheme, can easily be made according to the method and apparatus of the present invention which is illustrated schematically in FIGS. 4 and 5. The method and apparatus of the present invention is a modification of the known method and apparatus for making reverse oscillating lay (ROL) stranded optical fiber cable such as that shown in FIG. 2. According to the present invention, the method and apparatus for making ROL stranded optical fiber cable is modified by including provisions for placing detectable marks on the cable core, for detecting and tracking the marks, and for placing marks on the outer jacket of ROL cables during the manufacturing process to indicate switchback locations.

Referring to FIG. 4, according to the present invention buffer tubes from buffer tube payoffs 70 through 74 are fed to a reverse oscillating strander 76 wherein the tubes are stranded about a central strength member in a reverse oscillating manner to form an ROL fiber optic cable core 77. The directional change of the reverse oscillating lay strander 76 is controlled by the reverse oscillating lay strander controller 78 which is connected to the reverse oscillating strander 76 by line 80.

A switchback marking device 82, such as a Dell Marking Systems Model DS-10-AFKR Micro-mini marker printer, is located downstream from the ROL strander 76. The switchback marking device 82 is controlled by a companion Dell Model DCM-2020-19 controller 81 which receives a signal from the ROL strander controller 78 via line 84. According to the present invention, each time the ROL strander controller 78 sends a signal via line 80 to the ROL strander 76 to cause the ROL strander 76 to reverse the direction of the stranding lay, the ROL strander controller 78 also sends a signal via line 84 to the marking device controller 81 which in turn causes the marking device 82 to apply a detectable marking, such as a metallic, magnetic, fluorescent or luminescent paint, on the cable core 77. As previously discussed, the marking 62 may be made anywhere on the cable core 77 provided that the relationship between the location of the marking 62 and the location of the switchback 63 is known. The relationship between the location of the markings 62 on the cable core 77 and the location of the switchback can be made known by positioning marking device 82 a predetermined distance d downstream from the ROL strander 76. If the marking is to be placed directly on the switchback, distance d will ordinarily be a distance downstream from the strander 78 such that the marking device 82 is substantially aligned with a switchback 63 which has exited the strander 76 when the strander 76 reverses lay direction as caused by the signal from controller 78. However, if the marking is to be offset from the switchback 63, distance d will be a distance which places the marking device 82 in some predetermined offset position relative to the switchback location when the ROL strander changes direction.

Alternatively, a position encoder 83 can be used to monitor the distance the cable core 77 has traveled from the ROL strander 76 after a reversal and to provide information to the controller 81 which in turn causes the marking device 82 to make a mark on the core 77 at a predetermined location relative to the location of a switchback 63. According to ordinary ROL stranded cable core manufacturing practices, the marked ROL fiber optic cable core 86 is taken up on a spool 88 for use as feed material for a subsequent final manufacturing process which includes the application of an outer protective jacket.

Now referring to FIG. 5, the marked reverse oscillating lay cable core 86 is taken from spool 88 and passed by sensor 90 prior to entering an extruder 92. Sensor 90, such as a Sick Electronics, Model LUT 2-6 luminescence scanner, provides a signal to a marking controller 94, such as a programmable logic controller or personal computer, via line 96 each time a mark 62 passes by the sensor 90. As will be further explained below, the marking controller 94 continuously predicts the position of each sensed mark 62 before, during and after the extrusion process that places a jacket over the core 86. Thus, the mark 62 provides reference information about the location of a switchback to the controller 94.

According to the present invention, after passing by the sensor 90, the core 86, containing one or more marks 62, is fed though the extruder 92 wherein a protective outer jacket is applied to the cable core 86 to form a jacketed cable 99. At the time sensor 90 provides a signal to the marking controller 94 indicating the detection of a mark 62 prior to the covering of the mark by the extruder, the marking controller 94, having memory, also stores the length count-position of the mark 62 on core 86 via input from a length counter/position encoder 98, such as a Beta Instruments length counter model MG1070/MI800-A with position encoder model XH25D, through line 100. The length counter/position encoder 98, positioned down stream from the extruder 92, provides continuous reference information to the marking controller 94 about the distance the cable core 77, and hence the mark 62, has moved from the sensor 90. Based on the length information received from the length counter/position encoder 98, the marking controller 94 provides a signal to a jacket marking device 102, such as a Matthews Model 4200 ink jet printer, located a distance D from sensor 90, via line 104 to cause it to apply a marking to the cable jacket 99 when the controller 94 determines, based on the predicted position of mark 62, that a switchback is located at a predetermined distance relative to the marking device 102. Once a marking has been applied and is affixed to the jacketed cable, the marked jacketed cable 42 is taken up on spool 106.

While the method and apparatus of the present invention is particularly useful for marking the location of switchbacks on the outer jacket of a ROL or S-Z stranded cable, those skilled in the art should appreciate that the invention can be used to mark any stranded cable wherein there is a need to supply information about a change in the lay of the cable elements within the interior of the cable to the exterior. The method and apparatus of the present invention can be easily adapted to mark slotted core ROL cables such as that shown in FIG. 1. Instead of a ROL strander 76, a controller for slotted core extruder, which controls the reversal of the extruder die to form the helical shape of the core, is used to trigger marking controller 78. Each time the rotation of the die of the slotted core extruder is reversed by the extruder controller, a signal is provided to the controller 78 which in turn provides a marking on the slotted core at a desired location relative to the reversal point. All other aspects of the method and apparatus of the present invention may be applied to achieve a marking of the outer jacket of the slotted cable without modification from that described for the stranded cable.

The embodiments of the present invention disclosed herein admirably achieve the objects set forth; however, it should be appreciated by those skilled in the art that departures can be made by those skilled in the art without departing from the spirit and scope of the invention which is limited only by the following claims.

What is claimed is:

1. An apparatus for manufacturing a communications cable containing switchbacks having markings on an outer jacket for indicating switchback locations, the apparatus comprising:

means for forming a cable core having a plurality of buffer tubes containing at least one communications element, the plurality being arranged so as to have a first lay orientation region, a second lay orientation region, and a transition region containing a switchback between the first lay orientation region and the second lay orientation region, the means further including means for providing a signal indicating the formation of a switchback;

means for providing a detectable marking on the plurality of buffer tubes of the cable core in a predetermined position relative to the switchback, the means for providing a detectable marking being responsive to the signal from the means for forming the cable core;

means for sensing the detectable marking on the plurality of buffer tubes;

means for surrounding the plurality of buffer tubes with an outer jacket;

means for predicting the position of the marking on the plurality of buffer tubes relative to the position of the means for sensing; and means, responsive to the means for predicting, for providing a marking on the outer jacket in a predetermined position relative to the predicted position of the marking on the plurality of buffer tubes when the means for providing determines that the predicted position of the marking on the plurality of buffer tubes reaches a predetermined position from the means for sensing.

2. The apparatus of claim 1, wherein the means for forming the cable core comprises a reverse oscillating lay strander and wherein the means for providing a signal indicating the formation of a switchback is a reverse oscillating lay strander controller.

3. The apparatus of claim 1, wherein the means for providing a detectable marking comprises a detectable marking controller which is responsive to the signal indicating the formation of a switchback from the reverse oscillating lay strander controller, and a marking device, responsive to the detectable marking controller, positioned at a predetermined distance d from the reverse oscillating lay strander.

4. The apparatus of claim 1, wherein the means for providing a detectable marking comprises a position encoder for providing a traveled distance signal indicating a distance the switchback has traveled from the reverse oscillating lay strander, a detectable marking controller which is responsive to the traveled distance signal from the position encoder and the signal indicating the formation of a switchback from the reverse oscillating lay strander controller, and a marking device, responsive to the detectable marking controller, positioned at a predetermined distance d from the reverse oscillating lay strander.

5. The apparatus of claim 3, wherein the means for sensing the detectable marking on the core comprises a luminescence scanner.

6. The apparatus of claim 3, wherein the means for predicting the position of the detectable marking on the plurality of buffer tubes comprises a second position encoder for providing a length count-position signal for the detectable mark on the core, and a marking controller responsive to the length count-position signal; and wherein the means for providing a marking on the outer jacket comprises a printer which is located a predetermined distance D from the means for sensing.

7. An apparatus for manufacturing a communications cable having a core containing a plurality of grooves for containing communications elements, the grooves being arranged so as to create switchbacks, and having an outer jacket with markings indicating switchback locations, the apparatus comprising:

means for forming a cable core having a plurality of grooves arranged so as to have a first lay orientation region, a second lay orientation region, and a transition region containing a switchback between the first lay orientation region and the second lay orientation region, the means further including means for providing a signal indicating the formation of a switchback;

means for providing a detectable marking on the core in a predetermined position relative to the switchback, the means for providing a detectable marking being responsive to the signal from the means for forming the cable core;

means for sensing the detectable marking on the plurality of buffer tubes;

means for surrounding the plurality of buffer tubes with an outer jacket;

means for predicting the position of the marking on the plurality of buffer tubes relative to the position of the means for sensing; and means, responsive to the means for predicting, for providing a marking on the outer jacket in a predetermined position relative to the predicted position of the marking on the plurality of buffer tubes when the means for providing determines that the predicted position of the marking on the plurality of buffer tubes reaches a predetermined position from the means for sensing.

8. The apparatus of claim 7, wherein the means for forming the cable core comprises an reverse oscillating extrusion die and wherein the means for providing a signal indicating the formation of a switchback is a reverse oscillating extrusion die controller.

9. The apparatus of claim 8, wherein the means for providing a detectable marking comprises a detectable marking controller which is responsive to the signal indicating the formation of a switchback from the reverse oscillating extrusion die controller, and a marking device, responsive to the detectable marking controller, positioned at a predetermined distance d from the reverse oscillating extrusion die.

10. The apparatus of claim 8, wherein the means for providing a detectable marking comprises a position encoder for providing a traveled distance signal indicating a distance the switchback has traveled from the reverse oscillating extrusion die, a detectable marking controller which is responsive to the traveled distance signal from the position encoder and the signal indicating the formation of a switchback from the reverse oscillating extrusion die controller, and a marking device, responsive to the detectable marking controller, positioned at a predetermined distance d from the reverse oscillating extrusion die.

11. The apparatus of claim 10, wherein the means for sensing the detectable marking on the core comprises a luminescence scanner.

12. The apparatus of claim 10, wherein the means for predicting the position of the detectable marking on the core comprises a second position encoder for providing a length count-position signal for the detectable marking on the core, and a marking controller responsive to the length count-position signal, and wherein the means for providing a marking on the outer jacket comprises a printer which is located a predetermined distance D from the means for sensing.

13. A method for making a communications cable containing commnications element switchbacks and having markings on an outer jacket for indicating switchback locations, the method comprising the steps of:

(a) forming a cable core having a plurality of buffer tubes containing at least one communications element arranged so as to have a first lay orientation region, a second lay orientation region, and a transition region containing a switchback between the first lay orientation region and the second lay orientation region;

(b) providing a signal indicating the formation of the switchback in the cable core;

(c) providing a detectable marking on the plurality of buffer tubes at a predetermined position relative to the switchback in response to the signal indicating the formation of a switchback;

(d) sensing the detectable marking on the plurality of buffer tubes with a sensor;

(e) surrounding the plurality of buffer tubes having the detectable marking thereon with an outer jacket;

(f) predicting the position of the detectable marking on the plurality of buffer tubes relative to the position of the sensor; and (g) providing a marking on the outer jacket in a predetermined position relative to the marking on the plurality of buffer tubes when the predicted position of the detectable marking on the plurality of buffer tubes reaches a predetermined position from the sensor.

14. A method for making a communications cable having a core containing a plurality grooves for containing communications elements, the grooves being arranged so as to create switchbacks and the cable further having an outer jacket with markings indicating switchback locations, the method comprising the steps of:

(a) forming a cable core having a plurality of grooves arranged so as to have a first lay orientation region, a second lay orientation region, and a transition region containing a switchback between the first lay orientation region and the second lay orientation region, (b) providing a signal indicating the formation of the switchback in the cable core;

(c) providing a detectable marking on the core at a predetermined position relative to the switchback in response to the signal indicating the formation of the switchback;

(d) sensing the detectable marking on the core with a sensor;

(e) surrounding the core having the detectable marking thereon with an outer jacket;

(f) predicting the position of the detectable marking on the core relative to the position of the sensor; and (g) providing a marking on the outer jacket in a predetermined position relative to the marking on the core when the predicted position of the detectable marking on the core reaches a predetermined position from the sensor.

* * * * *

UNITED STATES PATENT AND TRADEMARK OFFICE
CERTIFICATE OF CORRECTION

PATENT NO. : 5,809,194
DATED : September 15, 1998
INVENTOR(S) : Raymond Gordon Lovie It is certified that error appears in the above-identified patent and that said Letters Patent is hereby corrected as shown below:

In Column 9, Line 58: delete "cohmnications" and insert therefor --communications--.

Signed and Sealed this

Twenty-ninth Day of December, 1998

Attest:

BRUCE LEHMAN

*Attesting Officer*   *Commissioner of Patents and Trademarks*